US012008910B2

(12) United States Patent
Singh (10) Patent No.: US 12,008,910 B2
(45) Date of Patent: Jun. 11, 2024

(54) UAV SYSTEM EMERGENCY PATH PLANNING ON COMMUNICATION FAILURE (71) Applicant: IDEAFORGE TECHNOLOGY PVT. LTD, Navi Mumbai (IN)

(72) Inventor: Rahul Singh, Navi Mumbai (IN)

(73) Assignee: IDEAFORGE TECHNOLOGY PVT. LTD, Navi Mumbai (IN)

( * ) Notice: Subject to any disclaimer, the term of this patent is extended or adjusted under 35 U.S.C. 154(b) by 226 days.

(21) Appl. No.: 16/636,412

(22) PCT Filed: Jul. 27, 2018

(86) PCT No.: PCT/IB2018/055628
§ 371 (c)(1),
(2) Date: Feb. 4, 2020

(87) PCT Pub. No.: WO2019/025919
PCT Pub. Date: Feb. 7, 2019

(65) Prior Publication Data
US 2020/0175882 A1    Jun. 4, 2020

(30) Foreign Application Priority Data

Aug. 4, 2017  (IN) .............................. 201721027849

(51) Int. Cl.
G08G 5/00 (2006.01)
B64C 39/02 (2023.01)
G05D 1/00 (2006.01)
(52) U.S. Cl.
CPC ......... *G08G 5/0039* (2013.01); *B64C 39/024* (2013.01); *G05D 1/0022* (2013.01);
(Continued)

(58) Field of Classification Search
CPC ............ B64C 39/024; B64C 2201/146; B64C 2201/141; G05D 1/0022; G05D 1/0055;
(Continued)

(56) References Cited

U.S. PATENT DOCUMENTS 7,228,232 B2 * 6/2007 Bodin .................. G05D 1/0044
701/301
9,658,619 B1 * 5/2017 Bethke .................. B64C 39/024
(Continued)

FOREIGN PATENT DOCUMENTS

JP         2017501475 A  *  1/2017
WO    WO-2018120350 A1 *  7/2018 ............. G05D 1/102

OTHER PUBLICATIONS

Machine Translation WO-2018120350-A1 (year:2018).*
Machine Translation JP-2017501475-A (year:2017).*

*Primary Examiner* — Anne Marie Antonucci
*Assistant Examiner* — Connor L Knight
(74) *Attorney, Agent, or Firm* — Taft Stettinius & Hollister LLP; Derek B. Lavender (57) ABSTRACT

The present disclosure relates to a system and method for executing safe-return of an Unmanned Aerial Vehicle (UAV) moving along a path having a plurality of communication waypoints in the event of a communication failure. In an aspect, the proposed method can include the steps of detecting, at the UAV, a communication failure; enabling the UAV to return to last healthy communication waypoint location; and based on status of the communication failure, enabling the UAV to return to its home location.

10 Claims, 3 Drawing Sheets

(52) U.S. Cl.
CPC ......... *G05D 1/0055* (2013.01); *G08G 5/0056* (2013.01); *G08G 5/0069* (2013.01); *B64U 2201/20* (2023.01)

(58) Field of Classification Search
CPC .. G08G 5/0039; G08G 5/0056; G08G 5/0069; G08G 5/045; G08G 5/0034
See application file for complete search history.

(56) References Cited

U.S. PATENT DOCUMENTS

| | | | |
|---|---|---|---|
| 10,043,398 B2* | 8/2018 | Akselrod | G08G 5/0091 |
| 2006/0106506 A1* | 5/2006 | Nichols | G05D 1/106 |
| | | | 701/3 |
| 2014/0142787 A1* | 5/2014 | Tillotson | G08G 5/0052 |
| | | | 701/3 |
| 2015/0323932 A1* | 11/2015 | Paduano | G05D 1/0676 |
| | | | 701/3 |
| 2016/0084936 A1* | 3/2016 | Smith | G01C 17/02 |
| | | | 455/456.1 |
| 2017/0233071 A1* | 8/2017 | Pilskalns | G08G 5/0069 |
| | | | 701/2 |
| 2017/0351254 A1* | 12/2017 | Listwin | B64C 39/024 |
| 2018/0160433 A1* | 6/2018 | Kim | H04B 7/18504 |
| 2018/0239350 A1* | 8/2018 | Cantrell | G05D 1/0038 |
| 2019/0265696 A1* | 8/2019 | Song | H04B 17/318 |
| 2019/0316910 A1* | 10/2019 | Floury | H04B 7/18504 |
| 2019/0369648 A1* | 12/2019 | Fang | G05D 1/106 |

* cited by examiner

UAV SYSTEM EMERGENCY PATH PLANNING ON COMMUNICATION FAILURE

This application is a national phase entry of PCT/IB2018/055628 filed on Jul. 27, 2018 which claims the benefit of Indian Application No. 201721027849 filed Aug. 4, 2017. The disclosures of which are hereby incorporated herein in their entirety.

TECHNICAL FIELD

The present disclosure generally relates to the field of unmanned aerial vehicles (UAVs). In particular, the present disclosure pertains to communication failure during flight of a UAV and how an efficient emergency path planning can be done in the event of a communication failure.

BACKGROUND

Background description includes information that may be useful in understanding the present invention. It is not an admission that any of the information provided herein is prior art or relevant to the presently claimed invention, or that any publication specifically or implicitly referenced is prior art.

Unmanned Aerial Vehicles (UAV) are being increasingly employed for situations where direct human contact could be dangerous, difficult or economically and technically unfeasible to say the least. In such situations, an UAV could technically provide more than an "eye" to operator(s) among other associated individuals relying thereon. While promising far reaching coverage and communication of target areas/locations to base station, on account of different sensor(s) and payload(s), UAVs, at times, could prove to be dangerous for life and property on loss or complete failure of communication.

In particular, smaller UAVs must have access to communications and navigation signals for some parts of their missions, including (safe) landing. In general, planning for a nominal mission typically makes use of a pre-programmed flight path that includes consideration of where and when these signals can be available and where and when they are expected to be blocked. This finds significance since flight, in-absence of regular human feedback, may lead to increased changes of an avertable incident.

However, sometimes communication or navigation signals can be unexpectedly blocked for one or more reasons such as, for example but need not necessarily, by jamming or by landform factors (i.e. terrain) or due to some other contingency forces like flying an improvised route to pursue a suspect that may force departure from nominal mission path and thereby increase possibility of unforeseen collision and like incidents.

There have been efforts in the past to address aforementioned issues but with limited success and impractical viability. One solution could be to pre-program desired behavior of a UAV for events that involve emergency such that when the UAV loses communication, it executes a path pre-programmed to return to its home location by its operator as configured therein prior to the flight. This pre-programmed emergency route is usually planned to have the shortest distance (i.e. linear flight path) from the point of UAV's event of loss of communication to the home location. However, a disadvantage of such a linear flight path is the possibility of having obstacles in the way, since factors such as proper line-of-sight cannot not be properly taken into consideration. Alternatively, to avoid this, the pre-programmed emergency path may use the same pre-programmed flight path as traced by the UAV for the mission i.e. re-trace the path travelled by the UAV, but in this case the amount of time taken for the UAV to return to the home location can be more, and further, this would prove to be a hassle as the battery tested for a UAV during emergency is generally calculated based on time corresponding to the shortest distance, among other possible relevant factors.

There is therefore a need to provide emergency path planning for a UAV (or a system therefor) to safely return back to home location during an emergency situation/communication failure, wherein such planning ensures shortest distance flight path, while avoiding the possibility of colliding with any obstacle(s). Further, it would be an additional benefit in case there is a provision to regain control of the UAV, by its operator, even after one or more event(s) of communication failure.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all groups used in the appended claims.

OBJECTS OF THE INVENTION

A general object of the present disclosure is to provide simple, safe, and fast UAV emergency path planning that does not have shortcomings of conventional communication failure path planning techniques.

An object of the present disclosure is to provide a safety-centered UAV path planning method for events involving loss of communication with home location.

Another object of the present disclosure is to provide a shortest-distance flight path for emergency return journey of a UAV while taking into account probability of obstacle(s).

SUMMARY

Aspects of the present disclosure generally relate to the field of unmanned aerial vehicles (UAVs), and in particular, to communication failure(s) during flight of a UAV. More specifically, the present disclosure relates to shortest and safest emergency path planning upon communication failure of the UAV.

In an aspect, the present disclosure relates to a method for executing safe-return of an Unmanned Aerial Vehicle (UAV) moving along a path having a plurality of communication waypoints, the method comprising the steps of: detecting, at the UAV, a communication failure; enabling the UAV to return to last healthy communication waypoint location; and based on status of the communication failure, enabling the UAV to return to its home location.

In an aspect, the UAV returns back to the home location using linear shortest flight path from the last healthy communication waypoint location to the home location. In another aspect, the UAV returns back to the home location if the communication failure does not return within a defined time period, wherein in case the communication returns within the defined time period, the UAV waits for user command.

The present disclosure further relates to a system configured to enable safe-return of a UAV moving along a path having a plurality of communication waypoints, said system comprising a communication module; and a flight control system (102) operatively coupled with the communication module so as to detect a communication failure and, based on such detection, return to last healthy communication waypoint location, wherein based on status of the communication failure within a defined time period, the flight control system is configured to enable the UAV to return to its home location.

In an aspect, the UAV returns back to the home location using linear shortest flight path from the last healthy communication waypoint location to the home location. In another aspect, the UAV returns back to the home location if the communication failure does not return within the defined time period, wherein in case the communication returns within the defined time period, the UAV waits for user command.

In another aspect, the flight control system can further be configured to, using one or more sensors, monitor UAV parameters selected from any or a combination of location, payload, speed, height, direction, path traversed, and fuel level.

In yet another aspect, the communication failure can be detected based on status of wireless radio link.

Various objects, features, aspects and advantages of the inventive subject matter will become more apparent from the following detailed description of preferred embodiments, along with the accompanying drawing figures in which like numerals represent like components

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DETAILED DESCRIPTION

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims.

Various terms as used herein are shown below. To the extent a term used in a claim is not defined below, it should be given the broadest definition persons in the pertinent art have given that term as reflected in printed publications and issued patents at the time of filing.

Aspects of the present disclosure generally relate to the field of unmanned aerial vehicles (UAVs), and in particular, to communication failure(s) during flight of a UAV. More specifically, the present disclosure relates to shortest and safest emergency path planning upon communication failure of the UAV.

In an aspect, the present disclosure relates to a method for executing safe-return of an Unmanned Aerial Vehicle (UAV) moving along a path having a plurality of communication waypoints, the method comprising the steps of: detecting, at the UAV, a communication failure; enabling the UAV to return to last healthy communication waypoint location; and based on status of the communication failure, enabling the UAV to return to its home location.

In an aspect, the UAV returns back to the home location using linear shortest flight path from the last healthy communication waypoint location to the home location. In another aspect, the UAV returns back to the home location if the communication failure does not return within a defined time period, wherein in case the communication returns within the defined time period, the UAV waits for user command.

The present disclosure further relates to a system configured to enable safe-return of a UAV moving along a path having a plurality of communication waypoints, said system comprising a communication module; and a flight control system (102) operatively coupled with the communication module so as to detect a communication failure and, based on such detection, return to last healthy communication waypoint location, wherein based on status of the communication failure within a defined time period, the flight control system is configured to enable the UAV to return to its home location.

In an aspect, the UAV returns back to the home location using linear shortest flight path from the last healthy communication waypoint location to the home location. In another aspect, the UAV returns back to the home location if the communication failure does not return within the defined time period, wherein in case the communication returns within the defined time period, the UAV waits for user command.

In another aspect, the flight control system can further be configured to, using one or more sensors, monitor UAV parameters selected from any or a combination of location, payload, speed, height, direction, path traversed, and fuel level.

In yet another aspect, the communication failure can be detected based on status of wireless radio link.

Embodiments of the present disclosure generally relate to the field of unmanned aerial vehicles (UAVs), and in particular, to communication failure during flight of UAV. More specifically, the present disclosure relates to shortest and safest emergency path planning on the communication failure of the UAV.

In an aspect, the present disclosure provides a method for executing safe-return for an UAV (also referred to as a "vehicle" and both these terms used interchangeably hereinafter) moving along a path with a plurality of waypoints for a nominal mission, wherein method includes the steps of detecting an event of communication failure by the UAV, self-directing the UAV to a waypoint with last healthy signal (LHS) of the plurality of waypoints, and planning, by the UAV, an emergency mission with linear flight path (alternatively, flight path) from a source to a destination, wherein the source can be the waypoint with the LHS and the destination (say home location) can be pre-configured in the UAV.

In an aspect, method of the present disclosure can further include the step of communicating, by UAV, with home location to check for a healthy signal after moving to the waypoint with the LHS such that, upon successful communication from the home location, the UAV establishes a healthy signal while communicating with the home location, wherein the next step can be of detecting, by the UAV, a user command for further proceedings.

In an aspect, method of the present disclosure can further include the step of self-flying of UAV along linear flight path of emergency mission to a destination, wherein the destination is any of a plurality of waypoints with a healthy signal.

In an aspect, communication failure, as detected by UAV, can take place due to obstruction by an obstacle present substantially along line-of-sight from operator or home location to the UAV.

In an aspect, destination can be pre-configured before start of nominal mission based upon conditionality with reference to a threshold value for waypoint with a healthy signal. Alternatively, the destination can be pre-configured in-flight by UAV on communication failure based on any or a combination of obstacle features, battery power status, on-board instrument health, and distance travelled of total path of nominal mission.

In an aspect, selection of the waypoint with last healthy signal (LHS) can be done with any or a combination of one or more of the factors selected from the group of batter power status, nominal mission parameters (total time, total distance, distance travelled, payload weight and the like), payload condition/health, on-board sensor status/condition.

Although the present disclosure takes the example of an UAV while referring to various aspects thereof, it to be appreciated that any aerial vehicle enabled with provision of autonomous operation, for whole or a part of its flight, can readily make use of the present disclosure, from one or more considerations such as safe retrieval, for instance. Further, vehicles other than aerial-based vehicles, such as but not limited to land-based vehicles can also implement the present disclosure with minimum or no modifications, and all such variations have been well thought of and are well within the scope of the present disclosure.

Figure 1:
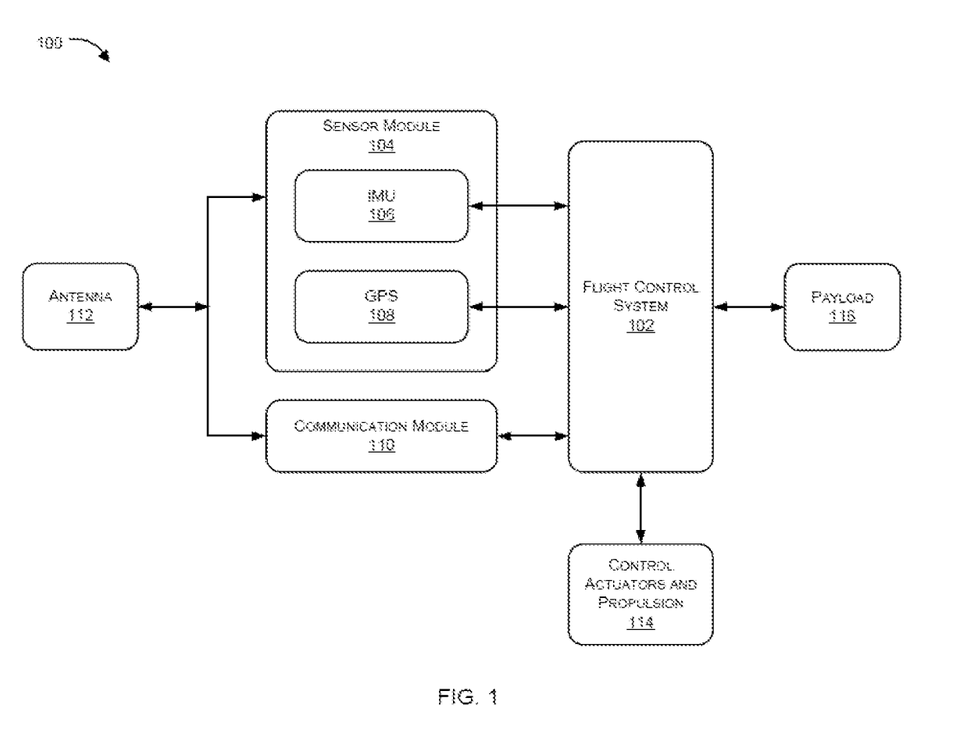
FIG. 1 illustrates an exemplary architecture diagram of the proposed UAV in accordance with an embodiment of the present disclosure.

FIG. 1 illustrates an exemplary architecture diagram of UAV 100 in accordance with an aspect of the present disclosure. As illustrated, UAV 100 can include a flight control system 102 in communication with modules/components such as a sensor module 104, a communication module 110, control actuators and propulsion 114, and payload 116. In an aspect, the control system 102 can be responsible for integration and/or management of such modules/components. Further, an antenna 112 can be in communication with the sensor module 104 and the communication module 110 such that the antenna 112 continuously interacts with base/home location. While in flight, the sensor module 104 can utilize one or more transducers such as, but need not necessarily, IMU (Inertia Measurement Unit) 106, GPS (Global Positioning System) 108, accelerometer, gyroscope, IR sensors and the like. As known to those skilled in the art, flight control systems, such as flight control system 102, of UAVs are typically implemented via computer-hardware comprising one or more microprocessors and memory, software and/or firmware.

Figure 2A:
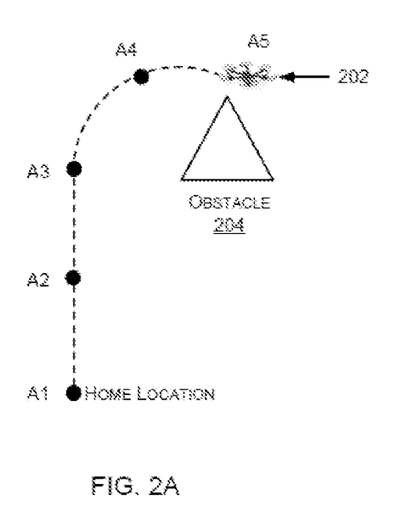
FIGS. 2A and 2B illustrate exemplary flight paths of UAV in accordance to an embodiment of the present disclosure.
Figure 2B:
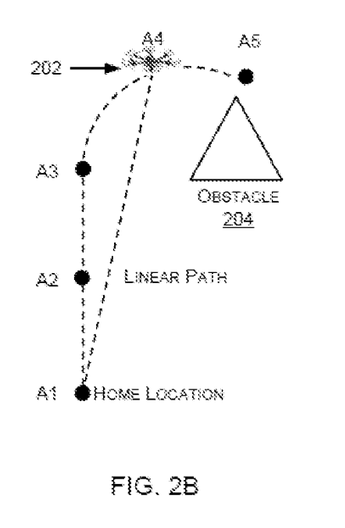

With respect to FIG. 2, in an aspect, a nominal mission for UAV 202 can include a path with a plurality of waypoints with variation in signal strength on account of communication failure due to component(s) malfunction or even due to presence of obstacle(s). Generally, when UAV 202 needs to perform nominal mission that can be pre-programmed into it or can be dynamically commanded, control system 102 directs the nominal mission functions and keeps track of the vehicle state, i.e., location, speed, fuel level, etc. by acquiring data from sensors (sensor module 104). During execution of the nominal mission, the control system 102 also keeps checking health of wireless radio link from GCS (Ground Control Station, or alternatively Ground Station/Home Location). If the wireless radio link is connected, the flight control system 102 can continue to guide the UAV 202 through its nominal mission. However, if wireless radio link communication (or simply communication) is lost, the flight control system 102 can direct the UAV 202 to its last healthy signal (LHS) communication waypoint location.

In an aspect, flight control system 102 can, not only store home/original takeoff location in its memory, but can also store last known healthy communication waypoint (A4 as illustrated in FIG. 2B) location. This data can be repeatedly updated as UAV 202 is in-flight and moves from one waypoint to the other of a plurality of waypoints for a nominal mission. Furthermore, the UAV 202 may be configured to send status/updates with sensor data such as GPS coordinates, altitude, velocity, acceleration, wind speed and other instrumental or environmental data that may be warranted to successfully undertake such mission, on reaching each waypoint of the plurality of waypoints. Notably, flight control system 102 can be configured to calculate and analyze underlying flight parameters to notify user, preferably on being queried, desirable information such as ETA (Estimated Time of Arrival) to next waypoint, average flight velocity, distance to empty or any other analysis as could be required.

FIGS. 2A and 2B illustrate exemplary flight paths of an UAV 202 in accordance to an embodiment of the present disclosure. In particular, FIG. 2A relates to nominal mission that enables UAV 202 to move along a path with a plurality of waypoints, for example waypoints A1, A2, A3, A4, and A5 (more waypoints possible while only these have been shown for better clarity and understanding). Herein, A1 can be "Home Location" from where the UAV 202 starts its nominal mission while moving to other waypoints A2 and onwards. As elaborated earlier also, during the nominal mission, a situation could arise such that there is a communication failure, as detected by the UAV 202, which can happen due to various reasons such as UAV 202 onboard-instrument malfunction/failure, inclement weather, and obstacle(s) among other possible reasons.

In an aspect, the present disclosure provides a method for executing conditional safe-return for an UAV 202 (Unmanned Aerial Vehicle) moving along a path with a plurality of waypoints (herein A1 to A5) for a nominal mission, wherein the method can include the steps of detecting an event of communication failure (near A5) by the UAV 202; self-directing the UAV 202 to a waypoint with last healthy signal (A4) of the plurality of waypoints; and planning, by the UAV 202, a emergency mission with linear flight path from a source to a destination, wherein the source can be the waypoint with the last healthy signal and the destination (say home location A1) can be pre-configured in the UAV 202. Notably, the communication failure can take place due to obstruction of line-of-sight from A5 to the UAV 202 by an obstacle 204.

In an aspect, FIGS. 2A and 2B illustrate conditions for communication failure due to obstacle 204. Herein, UAV 202 can be in a nominal mission mode while origination from A1 (Home Location) but somewhere during the flight, say at waypoint A5, there can be obstruction to radio link/signal from the A1 due to presence of obstacle 204 in line-of-sight to the UAV 202/A5. For reasons foretold in the present disclosure, retracing the nominal path or moving directly from A5 to A1 can lead to a security challenge for the UAV 202 from any obstacle(s) in linear path from A5 to A1. Retracing the nominal path may lead to an undesirably long time lapse with implications to on-board battery life of the UAV 202.

In an aspect, as would be evident, for one or more reasons relating to outside environment of UAV 202, while flying from Home Location (A1) to further waypoints A2 and thereon, it is possible for the UAV 202 to have (while receiving through antenna 112) varying quality, magnitude, or clarity of communication/radio link signal that is required for proper human assisted flight thereof. Such difference in quality of the signal would warrant proper differentiation from considerations such as safety, so as to set a threshold value for a healthy signal while taking into account user preference and other parameters as dynamically read and managed by flight control system 102.

In an aspect, say for communication failure at A5, UAV 202 can be configured to move back to waypoint with last healthy signal, in this case waypoint A4. Here, since the communication failure is due to obstacle 204 obstructing the line-of-sight from A1 to A5, the UAV 202 (or more particularly flight control system 102) can plan a linear flight path (marked with dotted line in FIG. 2B) from A4 to A1, for which the line-of-sight is expected to be free of any obstacles. Moreover, this would prove to be a better option at least from time and safety considerations, when compared to other conventional options as elaborated earlier.

In an aspect, linear flight path (as illustrated in FIG. 2B) may not be exactly linear from consideration such as change in height of UAV while in-flight for emergency mission. Even otherwise, a constant-height flight could require slight detour(s) from normal straight line of the linear flight path in view of some obstacle(s) and the like that could be readily detected by sensors as elaborated in some aspects of the present disclosure. It could also happen that such detour(s) put the UAV back on path of nominal mission thereafter the UAV can reconnect/re-communicate with Home Location, for directions such as rerouting to original pursuit on the nominal mission, or any other command from user.

In an aspect, selection of waypoint with last healthy signal (LHS) can be done (by UAV) with any or a combination of one or more of the factors selected from the group of battery power status, nominal mission parameters (total time, total distance, distance travelled, payload weight and the like), payload condition/health, on-board sensor status/condition among other factors. Moreover, the UAV can be configured to automatically share crucial data pertaining to the waypoint with the LHS as soon as the UAV reconnects with Home Location/user.

In an aspect, UAV may be configured to scan areas in vicinity of path (with a plurality of waypoints) of nominal missions so as to execute a preemptive action in order to prevent or lessen events of communication failure. Such scan would enable the UAV to automatically check for presence of obstacles, preferably by comparing characteristics of objects scanned in the path (or adjoining areas) with pre-stored characteristics/image of obstacles as can be accessed through a database. The database may be mission specific so as to take into account geographical and climatic features among other relevant factors such that there is a higher probability to timely predict and judge presence of obstacle(s). Further, the UAV may be configured to dynamically update a relevant part of such database as pertains to current and/or upcoming section of the path, keeping in mind constraints of storing large amount of data and various hardware required therefore, among other relevant factors as would be obvious to a person having ordinary knowledge in the art. Thus, timely detection of obstacles, primarily by comparison with database, can enable the UAV to automatically maneuver around immediate obstacles or may allow timely sharing of such possibilities with user (Home Location) so as to take command from the user. Moreover, UAV can be configured with a selection of different maps of target areas whether in a dynamic fashion or pre-stored in its memory. Further, online weather updates may be provided for the UAV to better equip it for handling of possible communication failures, mainly due to weather and related phenomenon.

In an aspect, UAV may be equipped with an image capturing means such cameras to regularly send images of vicinity of in-flight locations for nominal mission so as to enable a user to proceed accordingly, especially for events such as communication failure where such images can be highly beneficial. Moreover, images of areas around the UAV may possibly help in better judging characteristics/features of obstacle(s) that might have resulted in loss/failure of communication with Home Location. Further, images preferably with geo-tags may prove to be more beneficial to allow a user to plan SOP, such as from preliminary analysis the situation may appear to warrant relocating/moving Home Location/user so as to reconnect may be for short time period with better line-of-sight.

Figure 3:
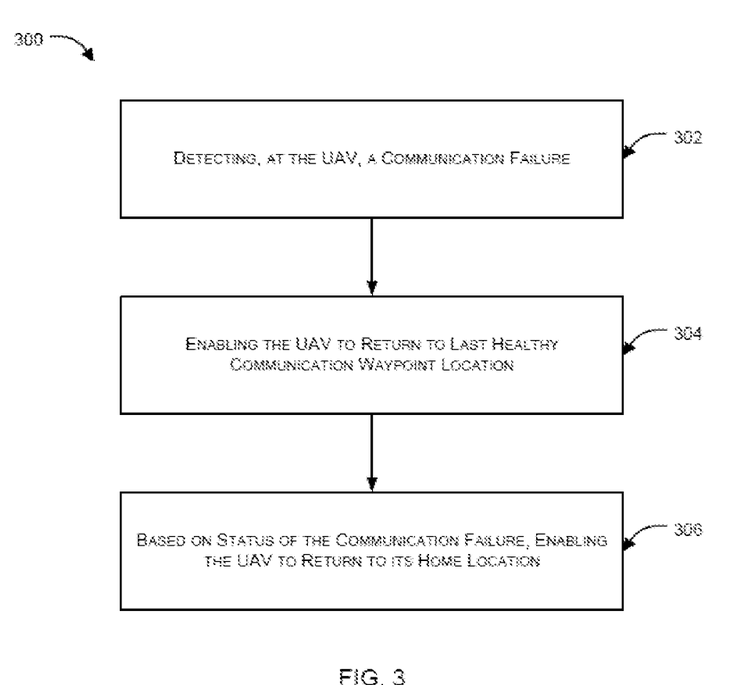
FIG. 3 illustrates an exemplary flow diagram showing execution of safe-return for UAV on communication failure in accordance to an embodiment of the present disclosure.

FIG. 3 illustrates an exemplary flowchart 300 for planning an emergency path for UAV 202 on communication failure, in accordance to an embodiment of the present disclosure. At step 302, the method can include the step of detecting, at the UAV, a communication failure; at step 304, enabling the UAV to return to last healthy communication waypoint location; and at step 306, based on status of the communication failure, enabling the UAV to return to its home location.

Since the present disclosure takes advantage of high probability of absence of obstacle(s) while flying/planning path from waypoint with last healthy signal (LHS) when encountering a communication failure (around further waypoint due to obstacle blocking direct line-of-sight to UAV), the present disclosure has made various references to emergency mission with reference to the waypoint with the LHS since it provides a balance of safety and efficiency of time. While it shall be well understood that any waypoint (say A2 or A3 for instance) even before the waypoint with the LHS can be preferred, for one or more reasons such as a user defined threshold for healthy signal strength and the like, over and above the waypoint with the LHS (A4 of FIGS. 2A and 2B) and all such variations are well within the scope of the present disclosure.

Thus, the present disclosure provides method for planning a safety and shortest-distance based emergency path for a UAV, particularly for conditions involving communication failure. Notably, there is also a provision to allow re-gaining of control by user/home station on conditional basis, as elaborated through various aspects of the present disclosure.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

Advantages of the Invention

The present disclosure provides a simple, safe and fast UAV emergency path planning that does not have shortcomings of conventional communication failure path planning techniques.

The present disclosure provides a safety-centered UAV path planning method for events involving loss of communication with Home Location.

The present disclosure provides a shortest-distance flight path for emergency return journey of a UAV while taking into account probability of obstacle(s).

I claim:

1. A method for emergency path planning for an Unmanned Aerial Vehicle (UAV) in an event of communication failure on account of an obstacle, said UAV moving along a path having a plurality of communication waypoints, each communication waypoint providing communication between the UAV and a home location through a wireless radio link, the method comprising the steps of:
   detecting, by a flight control system of the UAV, a communication failure resulting from loss of wireless radio link communication;
   enabling, by the flight control system, on detection of the communication failure, the UAV to return to a last healthy communication waypoint location, the last healthy communication waypoint location being a communication waypoint out of the plurality of communication waypoints with healthy signal and selected based on one or more factors selected from the group of on-board sensor status/condition and nominal mission parameters comprising total time, total distance, distance travelled, payload weight, payload condition/health; and
   waiting, at the last healthy communication waypoint location, by the flight control system, for a defined time period for communication to return before enabling the UAV to return to its home location.

2. The method of claim 1, wherein the UAV returns back to the home location using a linear shortest flight path from the last healthy communication waypoint location to the home location.

3. The method of claim 1, wherein the UAV returns back to the home location if the communication does not return within the defined time period.

4. The method of claim 1, wherein in case the communication returns within the defined time period, the UAV waits for user command.

5. A system configured for emergency path planning for a UAV in an event of communication failure on account of an obstacle, said UAV moving along a path having a plurality of communication waypoints, each communication waypoint providing communication between the UAV and a home location through a wireless radio link, said system comprising:
   a communication module;
   a flight control system operatively coupled with the communication module so as to detect a communication failure and, based on such detection, return the UAV to a last healthy communication waypoint location, the last healthy communication waypoint location being a communication waypoint out of the plurality of communication waypoints with healthy signal and selected based on one or more factors selected from the group of on-board sensor status/condition and nominal mission parameters comprising total time, total distance, distance travelled, payload weight, payload condition/health, wherein the flight control system is configured to wait for a defined time period before enabling the UAV to return to its home location, the detected communication failure resulting from loss of wireless radio link communication.

6. The system of claim 5, wherein the UAV returns back to the home location using a linear shortest flight path from the last healthy communication waypoint location to the home location.

7. The system of claim 5, wherein the UAV returns back to the home location if the communication does not return within the defined time period.

8. The system of claim 5, wherein in case the communication returns within the defined time period, the UAV waits for user command.

9. The system of claim 5, wherein the flight control system is further configured to, using one or more sensors, monitor UAV parameters selected from any or a combination of location, payload, speed, height, direction, path traversed, and fuel level.

10. The system of claim 5, wherein the communication failure is detected based on status of the wireless radio link.

\* \* \* \* \*